(12) United States Patent
Bakke et al.

(10) Patent No.: US 9,122,413 B2
(45) Date of Patent: Sep. 1, 2015

(54) IMPLEMENTING HARDWARE AUTO DEVICE OPERATIONS INITIATOR

(71) Applicant: International Business Machines Corporation, Armonk, NY (US)

(72) Inventors: Brian E. Bakke, Rochester, MN (US); Adrian C. Gerhard, Rochester, MN (US); Daniel F. Moertl, Rochester, MN (US); Rick A. Weckwerth, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/967,693

(22) Filed: Aug. 15, 2013

(65) Prior Publication Data
US 2015/0052265 A1    Feb. 19, 2015

(51) Int. Cl.
G06F 3/06    (2006.01)
(52) U.S. Cl.
CPC ............. *G06F 3/0659* (2013.01); *G06F 3/061* (2013.01); *G06F 3/067* (2013.01)
(58) Field of Classification Search
None
See application file for complete search history.

(56) References Cited

U.S. PATENT DOCUMENTS

| 7,805,543 | B2 | 9/2010 | Chang et al. | |
| 8,151,037 | B1 | 4/2012 | Zhou et al. | |
| 8,185,713 | B2 | 5/2012 | Shin et al. | |
| 2002/0108003 | A1* | 8/2002 | Ellis et al. | 710/39 |
| 2007/0005896 | A1 | 1/2007 | Chang et al. | |
| 2008/0120463 | A1* | 5/2008 | Ashmore | 711/114 |
| 2010/0235834 | A1 | 9/2010 | Faasse et al. | |
| 2010/0306420 | A1 | 12/2010 | Johnson et al. | |
| 2012/0303855 | A1 | 11/2012 | Bakke et al. | |
| 2012/0303886 | A1 | 11/2012 | Bakke et al. | |
| 2012/0304001 | A1 | 11/2012 | Bakke et al. | |
| 2012/0304198 | A1 | 11/2012 | Bakke et al. | |
| 2013/0054871 | A1 | 2/2013 | Lassa | |

OTHER PUBLICATIONS

International Search Report and Written Opinion of the ISA dated Nov. 15, 2014—International Application No. PCT/CN2014/084076.

* cited by examiner

*Primary Examiner* — Idriss N Alrobaye
*Assistant Examiner* — Dayton Lewis-Taylor
(74) *Attorney, Agent, or Firm* — Joan Pennington

(57) ABSTRACT

A method and controller for implementing hardware auto device op initiator in a data storage system, and a design structure on which a subject controller circuit resides are provided. The controller includes an inline hardware engine receiving host commands, and assessing a received command for starting without firmware involvement. The inline hardware engine builds one or more chains of hardware command blocks to perform the received command and starts executing the chain or chains for the received command.

20 Claims, 10 Drawing Sheets

IMPLEMENTING HARDWARE AUTO DEVICE OPERATIONS INITIATOR

FIELD OF THE INVENTION

The present invention relates generally to the data processing field, and more particularly, relates to a method and controller for implementing a hardware auto device operations initiator, and a design structure on which the subject controller circuit resides.

DESCRIPTION OF THE RELATED ART

Storage adapters are used to connect a host computer system to peripheral storage I/O devices such as hard disk drives, solid state drives, tape drives, compact disk drives, and the like. Currently various high speed system interconnects are used to connect the host computer system to the storage adapter and to connect the storage adapter to the storage I/O devices, such as, Peripheral Component Interconnect Express (PCIe), Serial Attach SCSI (SAS), Fibre Channel, and Infini-Band.

For many years now, hard disk drives (HDDs) or spinning drives have been the dominant storage I/O device used for the persistent storage of computer data which requires online access. Recently, solid state drives (SSDs) have become more popular since SSDs are typically capable of performing more I/Os per seconds (IOPS) than HDDs, even if their maximum data rates are not always higher than HDDs.

With the emergence of faster and higher performance solid state devices (SSDs), the performance requirements on storage subsystems has increased by more than an order of magnitude. This is especially true for command throughput, or small operations. More and more applications are emerging which take advantage of the very low latency and very high command throughput afforded by SSDs and the storage subsystem in many cases can become the bottleneck.

In traditional storage subsystems or RAID controllers, a request comes in from the host, and in many cases, the fetching of this request is automated by the hardware. The firmware interrogates the request and determines the course of action to take. Often this process involves starting the first in a sequence of asynchronous hardware operations. When the first operation completes, firmware reassess the op and determines the next course of action. This is done until the requested host operation is complete and a response is sent to the host.

In more recent high performance storage subsystems, many of these asynchronous hardware operations can be chained together allowing the firmware to set up all of the hardware operations, start the sequence and only process the completion of either the successful completion of the entire chain or an error somewhere along the way.

However, both the traditional implementations, and even the more recent high performance implementations still fall short of the growing performance needs on storage subsystems. Even the high performance designs require the firmware to decide the course of the op at least twice, at the outset of the chain, and upon completion of the chain, and still require firmware to interrogate the host request and build the hardware control blocks to execute the op. Often, just waking up the firmware can consume as much as 30% of the controller's processor's time.

A need exists for an effective method and controller for implementing a hardware auto device operations initiator.

As used in the following description and claims, the terms controller and controller circuit should be broadly understood to include an input/output (TO) adapter (IOA) and includes an IO RAID adapter connecting various arrangements of a host computer system and peripheral storage I/O devices including hard disk drives, solid state drives, tape drives, compact disk drives, and the like.

SUMMARY OF THE INVENTION

Principal aspects of the present invention are to provide a method and controller for implementing a hardware auto device operations initiator, and a design structure on which the subject controller circuit resides. Other important aspects of the present invention are to provide such method, controller, and design structure substantially without negative effects and that overcome many of the disadvantages of prior art arrangements.

In brief, a method and controller for implementing a hardware auto device op initiator, and a design structure on which the subject controller circuit resides are provided. The controller includes an inline hardware engine receiving host commands, and assessing a received command for starting without firmware involvement. The inline hardware engine builds one or more chains of hardware command blocks to perform the received command and starts executing the one or more chains for the received command.

In accordance with features of the invention, the number of interactions between hardware and firmware is reduced to the firmware being involved only once for a host op, providing significantly better performance through the storage subsystem than conventional arrangements.

In accordance with features of the invention, the inline hardware engine includes registers for each logical host resource which allow auto-executed commands to be enabled and disabled for that host resource. The enable settings allow firmware to disable or partially disable the auto-execute functions per host resource in the case that the configuration for that resource does not allow auto-executing ops, such as resources requiring Logical Block Address (LBA) translation, which are caching, or are in error processing.

In accordance with features of the invention, the inline hardware engine includes registers for each logical host resource which directly link each host resource to a physical device and provide the engine routing information to the physical device. The generated device ops are directed at physical device described within these registers.

In accordance with features of the invention, the inline hardware engine checks the incoming commands to ensure they meet the criteria for an auto-executed op, such as a simple read or write without ordering requirements or the like.

In accordance with features of the invention, error and event handling code catches completions of these auto-executed ops. This code handles successful completions and simply initiates sending a good response to the host.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and controller for implementing hardware auto device op initiator, and a design structure on which the subject controller circuit resides is provided. The number of interactions between hardware and firmware is reduced to the firmware being involved only once for a host op. The firmware is not required to look at the host request and is not required to build or even look at any of the hardware control blocks. This removes at least 50% of the times firmware needs to be involved and removes the entire burden of building the op as compared to conventional implementations. This results in significantly better performance through the storage subsystem and enables many emerging workloads which SSDs are well suited.

Figure 1:
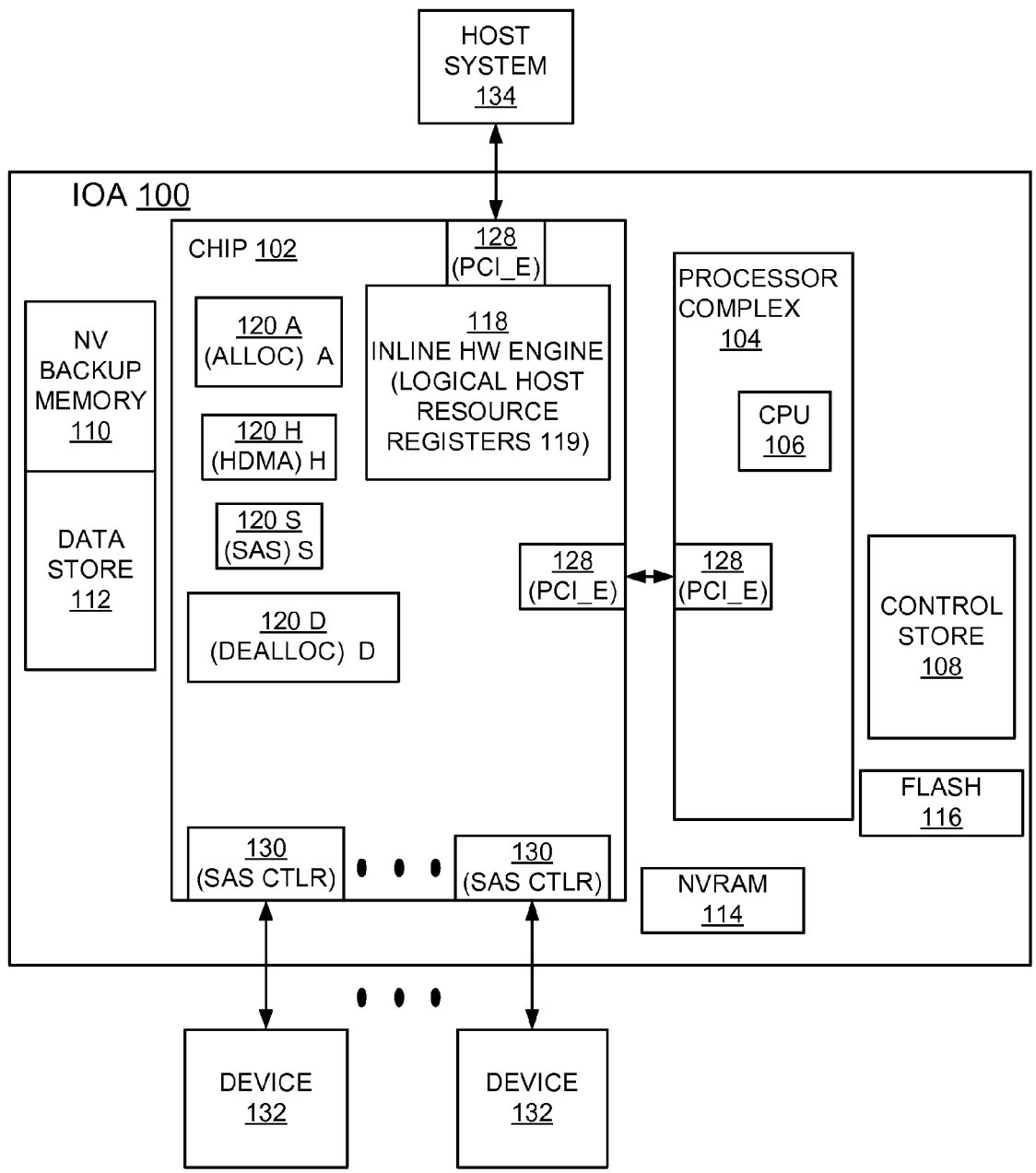
FIG. 1 is a schematic and block diagram illustrating an exemplary system for implementing a hardware auto device op initiator in accordance with the preferred embodiment.

Having reference now to the drawings, in FIG. 1, there is shown an input/output adapter (IOA) or controller in accordance with the preferred embodiment generally designated by the reference character 100. Controller 100 includes a semiconductor chip 102 coupled to at least one processor complex 104 including one or more processors or central processor units (CPUs) 106. Controller 100 includes a control store (CS) 108, such as a dynamic random access memory (DRAM) proximate to the CPU 106 providing command block, work queue and event queue storage. Controller 100 may include a non-volatile (NV) backup memory 110 and a data store (DS) 112 providing data and scratch buffers for command block set up and processing, for example, performed by hardware. Controller 100 may include a non-volatile random access memory (NVRAM) 114, and a flash memory 116.

In accordance with features of the invention, the controller 100 includes an inline hardware engine 118 receiving host commands from a host system 134, and assessing a received command for starting without firmware involvement. The inline hardware engine 118 builds one or more strings or chains of hardware command blocks to perform the received command and starts executing the one or more strings for the received command. The inline hardware engine 118 contains or is connected to registers 119 for each logical host resource which allow auto-executed commands to be enabled and disabled for that host resource. The inline hardware engine 118 contains or is connected to registers 119 for each logical host resource which directly link each host resource to a physical device and provide the engine routing information to get to the physical device. Device ops that are generated by the inline hardware engine 118 are directed at the physical device described within these registers 119.

In accordance with features of the invention, the registers 119 are associated with each logical host resource. These registers 119 contain the ability to enable and disable auto-reads and auto-writes. These registers 119 may also contain the ability to enable and disable other hardware offload operations. When an auto-execute function is enabled, no action other than turning on the enable registers 119 needs to be taken. When an auto-execute function is disabled, no action other than turning off the enable registers needs to be taken. This is because, any quiescent or synchronizing that must be performed, can be performed the same regardless of the auto-execute functions. When the auto-execute function is changed, for example, from auto-reads and auto-writes to only auto-reads, the auto-execute function can be disabled entirely, then enable only the functions desired. This ensures that no issues are caused by atomicity problems. The physical routing information is all kept within a single atomically modifiable register 119. Thus, if a path to a drive changes or must fail over to another path, the routing information can be updated without interruption of the auto-execute functions.

Controller semiconductor chip 102 includes a plurality of hardware engines for performing chains of hardware command blocks built by the inline hardware engine 118, such as, an allocate engine 120 A, a host direct memory access (HDMA) engine 120 H, a Serial Attach SCSI (SAS) engine 120 S, and a deallocate engine 120 D.

In accordance with features of the invention, substantial conventional firmware function is moved to HW operations performed by the inline hardware engine 118.

As shown, controller semiconductor chip 102 includes a respective Peripheral Component Interconnect Express (PCIe) interface 128 with a PCIe high speed system interconnect between the controller semiconductor chip 102 and the processor complex 104, and a Serial Attach SCSI (SAS) controller 130 with a SAS high speed system interconnect between the controller semiconductor chip 102 and each of a plurality of storage devices 132, such as hard disk drives (HDDs) or spinning drives 132, and solid state drives (SSDs) 132. The host system 134 is connected to the controller 100 with a PCIe high speed system interconnect. It should be understood that an external processor complex 104 is not required and could be embedded in the controller semiconductor chip 102.

DS 112, for example includes 8 GB of DRAM, stores volatile and or non-volatile 4 KB pages of Data, 32-byte cache line (CL) with one CL for each non-volatile page of the write cache in a contiguous area of DS and 32-byte parity update footprint (PUFP) in a contiguous area of DS after the CL area.

Figure 3:
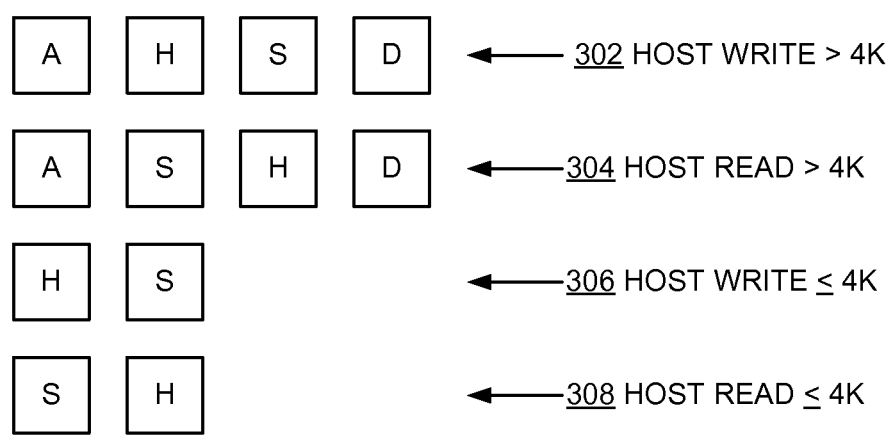
FIG. 3 illustrates example auto created chains implemented by the hardware auto device op initiator in accordance with the preferred embodiment.

The controller semiconductor chip 102 and control store (CS) 108 store chains of hardware command blocks built by the inline hardware engine 118, and other structures and command blocks, such as illustrated and described with respect to FIG. 3.

Figure 2:
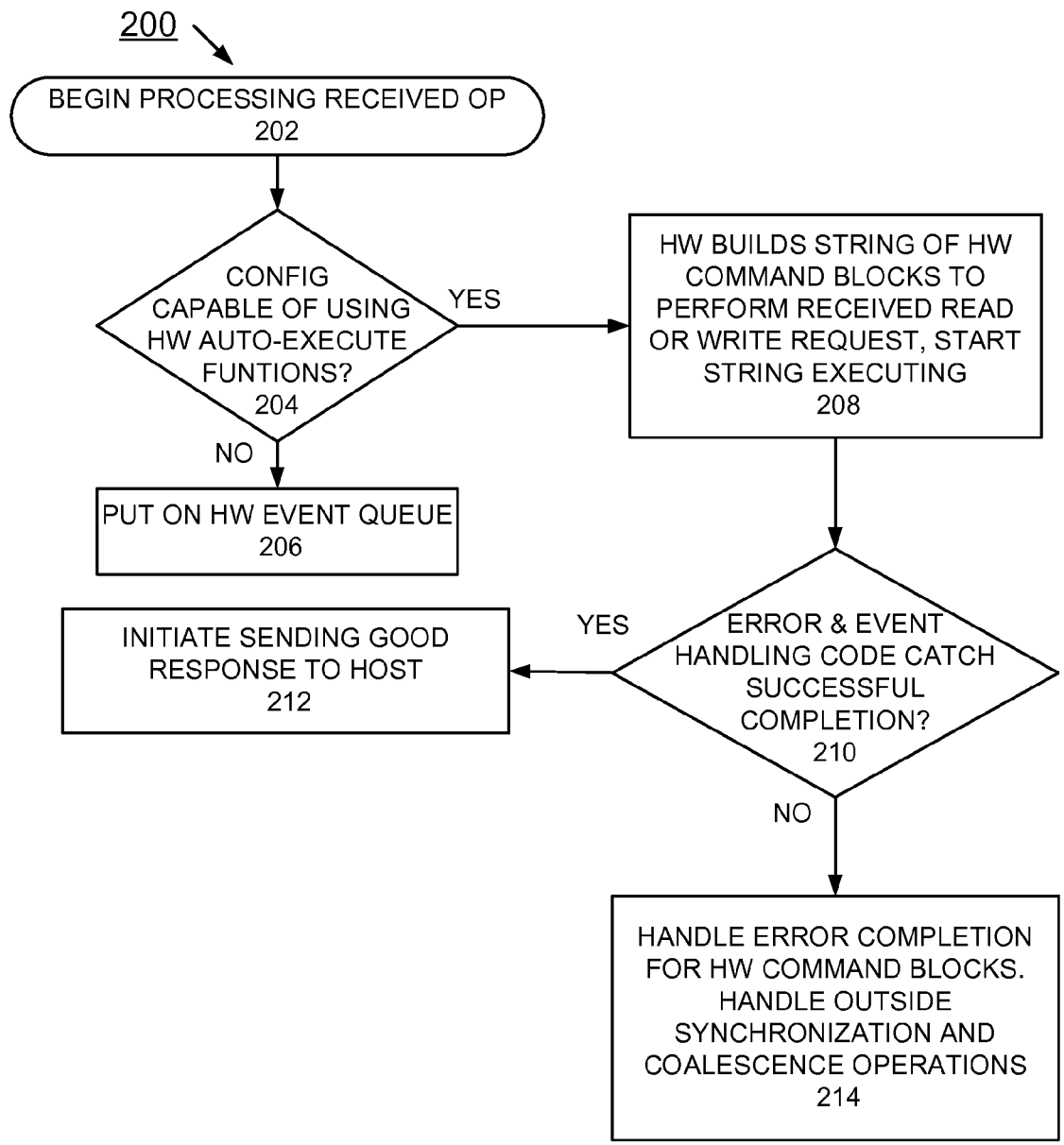
FIG. 2 illustrates example hardware operations for implementing a hardware auto device op initiator in accordance with the preferred embodiment.

Referring to FIG. 2, there are shown example hardware operations for implementing a hardware auto device op initiator generally designated by the reference character 200 in accordance with the preferred embodiment. As indicated in a block 202, processing of a received command or received op begins.

Assessing the command is performed to determine if the command can be started without firmware involvement as indicated in a decision block 204. When an op is initiated from the host, the hardware fetches down the control block describing the request, as with any request. As the control block arrives and is put into memory, the hardware interrogates the request at decision block 204. At decision block 204 the hardware then checks if the op is directed towards a logical resource which allows auto-executed operations. At decision block 204 the hardware checks if the op is a read or write. At decision block 204 the hardware checks if the op has only simple or un-tagged queue tags. At decision block 204 the hardware checks if the op has no other complex requirements.

For example at decision block 204, the inline hardware engine 118 checks the registers 119 for the logical host resource to determine if auto-executed commands are allow to be enabled and disabled for that host resource. The enable settings provided by registers 119 allow firmware to disable or partially disable the auto-execute functions per host resource in the case that the configuration for that resource does not allow auto-executing ops, such as resources requiring LBA translation, which are caching, or are in error processing. At decision block 204 the inline hardware engine 118 checks the incoming commands to ensure they meet the criteria for an auto-executed op, such as a simple read or write without ordering requirements or the like. If determined that the current configuration is not capable of using HW auto-execute functions at decision block 204, then the received command is placed on a HW event queue as indicated in a block 206.

If determined that the current configuration is capable of using HW auto-execute functions at decision block 204, then the inline hardware engine 118 builds one or more strings of hardware command blocks to perform a read or write request, then starts the strings executing as indicated in a block 208. The inline hardware engine 118 builds one or more strings of hardware command blocks to perform the request if the op is a read and meets the above described checks. For example, the hardware builds the control blocks in a 2K hardware buffer associated with the incoming host op, such as illustrated and described with respect to FIG. 3.

A direct index mode consists of a special set of pre-allocated resources which can be used on some small ops to reduce the overhead of going through a resource allocator at block 208. If an incoming op uses only one 4K page, a page is implicitly tied to each control block associated with host ops. This single page can be used directly rather than going through the normal page allocation engine.

Error and event handling code catches completions of these auto-executed ops as indicated in a decision block 210. This code handles successful completions and simply initiates sending a good response to the host as indicated in a block 212. Successful completions are only handled on successful completion of the control blocks at the end of the strings of hardware command blocks. Successful completions result in firmware only working on the op once per host request. Also, this firmware never needs to look at the host request and never needs to construct or even look at the hardware control blocks.

The error and event handling code at decision block 210 handles error completion of any hardware control block within the auto-executed strings of hardware command blocks as indicated in a block 214. The error handling code firmware assesses the failed string and builds the necessary controls to appear that the code had initiated the string of hardware command blocks. At block 214, the error handling code will then initiate error handling just as if the auto-executed operation had not been initiated without firmware intervention. Essentially, this code converts the auto-executed op into a normal, non-auto-executed op. The error and event handling code at block 214 handles outside synchronization and coalescence operations just as if the auto-executed ops had been built and executed with firmware knowledge. Synchronization or coalescence requests go through all possible control blocks to see if they are being executed and if so, potentially mark the op as needing synchronization or coalescence work. In good completions, all outside requests for synchronization or coalescence will be accounted for with a single if check checking a single variable per op. On error completions, after the ops have been converted, all handling is done within the error handling routines which handle normal non-auto op errors.

Referring now to FIG. 3, there are shown example auto created chains generally designated by the reference character 300 implemented by the hardware auto device op initiator in accordance with the preferred embodiment. Hardware HW interrogates the incoming host request and builds appropriate chain of ops. The illustrated auto created chains 300 include a host write chain 302 of greater than 4K, a host read chain 304 of greater than 4K, a host write chain 306 of less than or equal to 4K, and a host read chain 308 of less than or equal to 4K. The host write chain 302 of greater than 4K includes ops of an allocate A op to allocate pages or buffers to be used in the transfer of the data, a host direct memory access (HDMA) H op to transfer the data from the host memory across the PCIe bus into the allocated buffers for write or to transfer the data from the buffers across the PCIe bus to host memory for read, a Serial Attach SCSI (SAS) S op to write the data from the buffers to the drive or read the data from the drive into the allocated buffers, and a deallocate D op to free up the pages or buffers.

The host read chain 304 of greater than 4K includes ops of allocate A, SAS S, HDMA H, and deallocate D. The host write chain 306 of less than or equal to 4K includes ops of a host direct memory access (HDMA) H, and a Serial Attach SCSI (SAS) S. The host read chain 302 of less than or equal to 4K includes ops of SAS S, and HDMA H.

In accordance with features of the invention, for the ops of the host write chain 306 and host read chain 308 that are smaller than or equal to 4K, a pre-allocated page associated with the 2K hardware control block being used are used. This avoids building and using the allocate and deallocate control blocks in the host write chain 306 and host read chain 308, and has performance impacts in two areas. First, this reduces latency by removing the requirement that the allocate engine runs before the SAS or HDMA op can begin. Second, it reduces the number of control store interactions performed by the hardware. First by avoiding the setting up of the allocate and deallocate control blocks, removes two 16 or 32 byte control block writes to control store. Next by not linking in the allocate/deallocate engines, fetching those same control blocks is removed, saving even more control store operations. Finally, by not running the allocate and deallocate engines, both the page tables and the page free lists are not read/written saving another two to four accesses to control store.

For ops that only touch a single 4K page, the direct index mode is used, and the direct index has 1 page pinned to each 2K hardware control (HwCb) buffer. The use of the pre-allocated pages or direct index mode in not a requirement for the hardware auto-execute operations but it is a performance enhancement which can be utilized by the auto-execute operations. Each control block chain built has an event ID from an appropriate register set. Upon the successful completion of the last control block in a chain 302, 304, 306, 308 or the error completion of any control block in the chain, the event ID is used to inform firmware of the completion.

To build the allocate op A and deallocate op D, all of the data needed is contained within the host request. Based on the requested LBA and length, the span of 4K aligned pages can be determined. If this number is larger than one, an allocate and deallocate control block are generated. If the number is less than one, the pre-allocated implied page is used. Both the allocate and deallocate control blocks will be generated with the page table destination/source in an unused portion of the 2K hardware control block associated with the incoming host op.

To build the HDMA op H, all of the data needed is contained within the host request. The type of transfer, with or without headers, the required data checking, and the like, is included in the host request. The destination or source host memory address is also in the host request.

To build the SAS ops S, the information from the host request is used as well as information on how to route to the physical drive. This information is kept in the registers 119 with the inline HW engine 118 of FIG. 1 for the given logical host resource. This information includes the chip or SAS engine number for the SAS engine that will handle the op. This information also includes the port number and device number. The port number is the SAS port number attached to the given SAS engine. The device number is an index into an array kept by the SAS engine allowing the SAS engine to look up the SAS address for the given device 132. Essentially, all of the routing information that the hardware will need to get to the physical device 132 is kept within registers 119 in the chip 102, which the hardware can get to with no firmware intervention. These registers 119 are set up by the firmware prior to enabling the auto-execute functions.

Once the hardware control blocks are built as shown at block 208 in FIG. 2, the hardware will start the op in the same way firmware would start the op. The entire chain of ops will be executed, and upon successful completion, the hardware will generate an event informing the firmware of the successful completion of the chain as shown at block 212 in FIG. 2. In this case, firmware will catch this event, ensure nothing has happened which requires this event to be tracked, and initiate a response to the host.

If firmware needs to coalesce or synchronize all the outstanding ops as shown at block 214 in FIG. 2, an indication is placed into a control block associated with the host op. Upon successful completion, if this indication is on, the firmware control blocks will be adjusted to mimic the op having been firmware initiated. Then, the completion will be handled just as if the firmware had initiated the op as shown at block 214 in FIG. 2.

Figure 4:
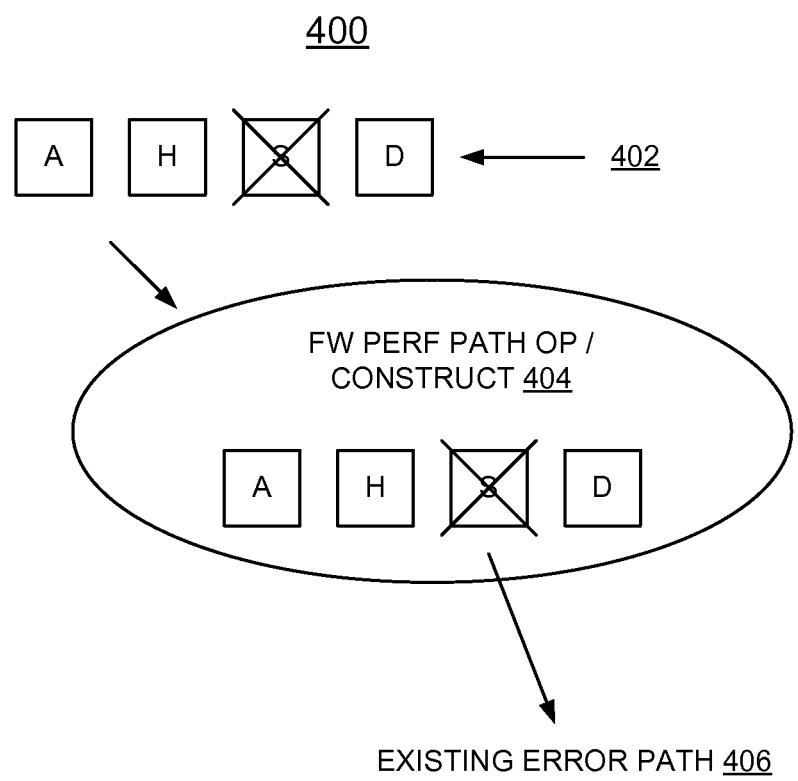
FIG. 4 illustrates an example error path of an example string of hardware command blocks implemented in accordance with the preferred embodiment.

In the event that any portion of the chain fails, for example as illustrated and described with respect to FIG. 4, just as if the chain had been initiated by firmware, the hardware will stop the chain and generate a failure event for the control block in the chain that failed, to handle error completion for HW command blocks as shown at block 214 in FIG. 2. The event ID will route the firmware to the proper event handler. The event handler will then alter or fill in the firmware control blocks that are or would be associated with this op had the op been initiated by firmware. Once everything in the firmware is set up to mimic the control blocks that would have existed had the op been initiated by the firmware, the firmware initiates processing of the failure event as if it were a failure of a normal firmware initiated op. From this point on, all error handling is the same as is done for normal firmware initiated operations.

Referring now to FIG. 4, there is shown an example error path generally designated by the reference character 400 of an example string of hardware command blocks implemented in accordance with the preferred embodiment. Error path 400 illustrates a host write chain 402 of greater than 4K including ops A, H, S, D with an error indicated in the Serial Attach SCSI (SAS) S block. On an error, an error event is generated for the failing HwCb. Firmware will convert the auto-started chain 402 into a chain that looks like FW started, or a FW performance path op/construct 404. Mostly, this just entails turning on a bit saying that FW knew it was executing. Also, the constructor is run to build the virtual function pointer tables. With everything looking like FW had started this op as a FW performance path op/construct 404, all the existing error handling code is used unchanged, as indicated at existing error path 406.

Figure 5A:
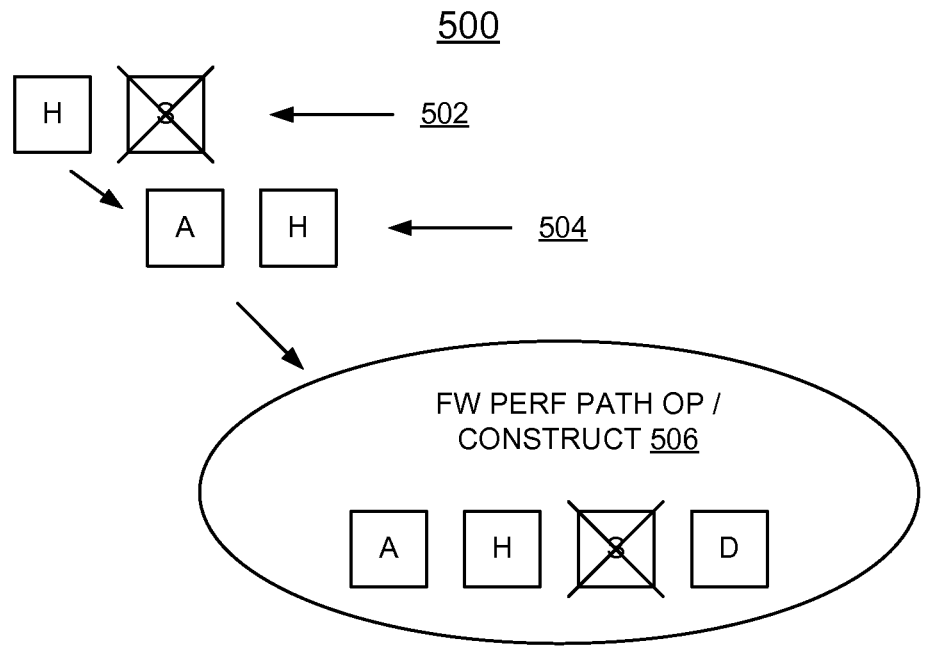
FIGS. 5A and 5B illustrate examples of handling of direct index errors in accordance with the preferred embodiment.
Figure 5B:
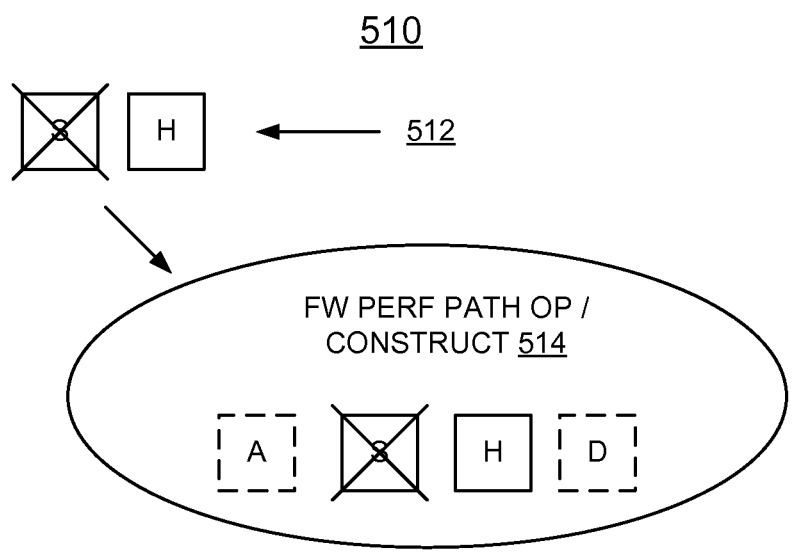

Referring now to FIGS. 5A and 5B, there are shown examples of handling of direct index errors respectively generally designated by the reference character 500 and 510 in accordance with the preferred embodiment.

In FIG. 5A, example 500 of handling of direct index errors includes a host write 502 of less than or equal to 4K including ops H, and S with an error indicated in the Serial Attach SCSI (SAS) S block. Firmware does not know about direct index use. On write failures, an allocate control block A and the HDMA control block H is rebuilt to follow the allocate, A. This new chain is executed as indicated by chain A, H 504. FW performance path op/construct 506 with the error in the S block is used for normal error processing.

In FIG. 5B, example 510 of handling of direct index errors includes a host write 512 of less than or equal to 4K including ops S, and H with an error indicated in the Serial Attach SCSI (SAS) S block. On read failures, the auto-read op using a direct index is converted to look like it was a performance path read op executed by FW. During error processing, the missing allocate, A, and deallocate, D, are not used. Once error processing has cleaned up the error, the entire op is reissued as a normal read op. A difference between this and what was previously done is that checking if the allocate or deallocate control block exists before deallocating the pages prior to restarting the op.

Figure 6A:
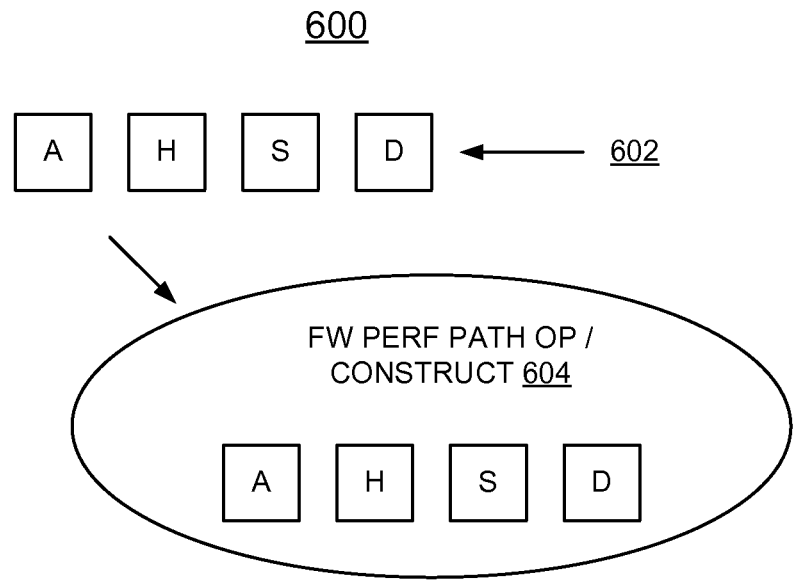
FIGS. 6A and 6B illustrate examples of firmware (FW) events and control in accordance with the preferred embodiment.
Figure 6B:
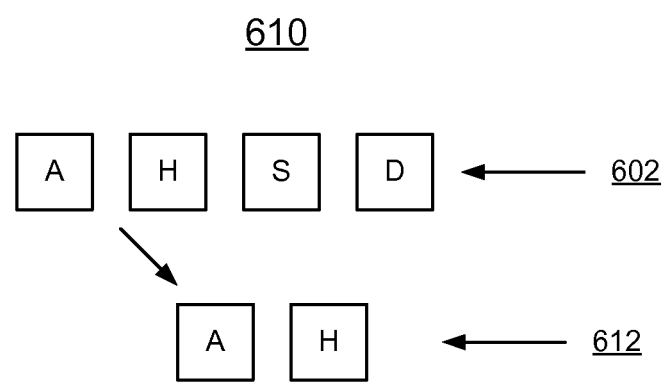

Referring now to FIGS. 6A and 6B illustrate examples of firmware (FW) events and control respectively generally designated by the reference character 600 and 610 in accordance with the preferred embodiment.

Figure 7A:
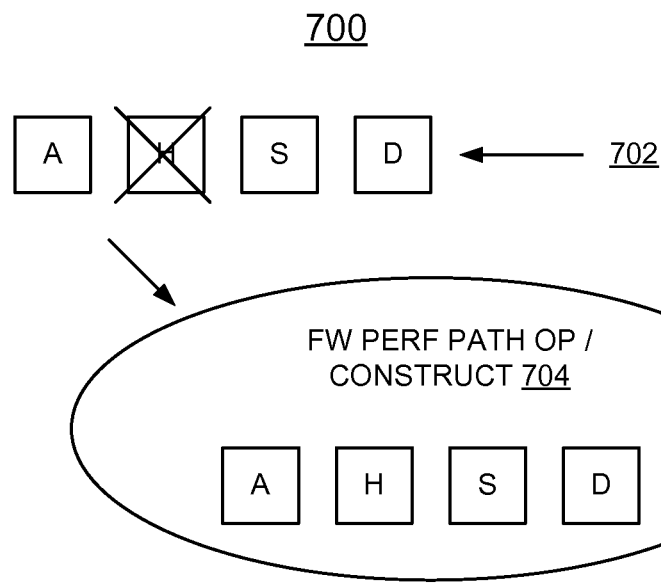
FIGS. 7A and 7B illustrate further examples of firmware (FW) events and control in accordance with the preferred embodiment.
Figure 7B:
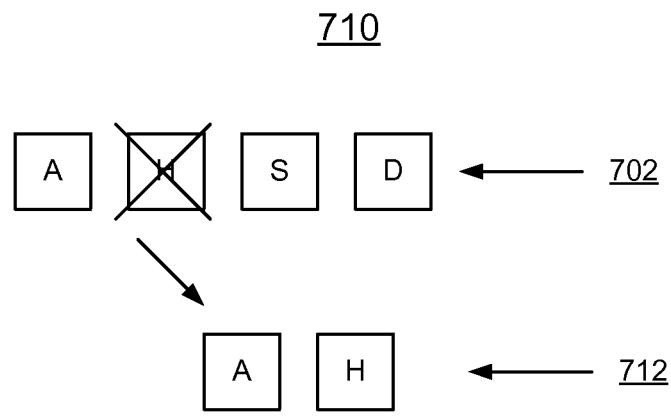

Referring also to FIGS. 7A and 7B illustrate further examples of firmware (FW) events and control respectively generally designated by the reference character 700 and 710 in accordance with the preferred embodiment.

In accordance with features of the invention, the examples of FIGS. 6A and 6B and of FIGS. 7A and 7B generally deal with the three different paths in the code that deal with converting an auto-SAS write. First, freezing everything is provided so that no new ops will be dispatched in the various engines. Next, checking is provided for the three positions that the op could be in. First, it could have already passed through the HDMA engine. In this case, the op is converted to a performance path write op as if FW had started it. Next, the op could have not yet entered the HDMA engine. In this case, the HDMA control block is changed to be last in chain so that when it does enter the HDMA engine, the chain does not continue on past the HDMA engine (and thus looks like an auto allocate and DMA op). Finally, if the op is in the HDMA engine, the op is aborted. This however proves difficult because it is an asynchronous operation. The abort may miss the op in the HDMA engine and the HDMA may finish cleanly, in which case this is handled the same as if the op had progressed beyond the HDMA engine. Or, the abort may actually stop the HDMA. In this case, sometimes this can be detected synchronously and sometimes it can not. When possible, the normal error processing is used take care of things. If it is not possible to tell, it is assumed that it may have made it past HDMA and thus the op is processed as if the op had progressed beyond the HDMA engine. Finally, in this case, receiving an abort event for the HDMA control block is handled for a chain which had been converted.

In FIG. 6A, example 600 of FW events and control includes a host write chain 602 of greater than 4K including ops A, H, S, D with an event indicated in the host direct memory access (HDMA) H block. FW converts the ops to a FW performance path op/construct 604 including performance path ops A, H, S, D.

In FIG. 6B, example 610 of FW events and control includes the host write chain 602 of greater than 4K including ops A, H, S, D with an event indicated in the host direct memory access (HDMA) H block. FW converts the ops to a FW performance path op/construct 612 including performance path ops A, H.

In FIGS. 6A and 6B, FW does not really know about these ops of the host write chain 602. When FW wants to do some operation where it is needed to stop or quiesce ops as indicated in the op H, FW needs to know about all ops, the FW converts the ops with FW searching through all the possible HW auto-ops and converts the ops to look like FW initiated performance path ops as illustrated by the FW performance path op/construct 604 in FIG. 6A, and in FW performance path op/construct 612 in FIG. 6B. On writes, due to the existing auto-allocate and DMA, ops may need to be converted into an auto-allocate and DMA op, which involves changing the HwCb to end the chain after the HDMA op H.

In FIG. 7A, example 700 of FW events and control includes a host write chain 702 of greater than 4K including ops A, H, S, D with an event and abort indicated in the host direct memory access (HDMA) H block. FW converts the ops to a FW performance path op/construct 704 including performance path ops A, H, S, D.

In FIG. 7B, example 610 of FW events and control includes the host write chain 702 of greater than 4K including ops A, H, S, D with an event and abort indicated in the host direct memory access (HDMA) H block. FW converts the ops to look like an auto-allocate and DMA op/construct 712 including ops A, H.

In FIGS. 7A and 7B, if the HDMA engine is executing the op H as indicated in the host write chain 702 when the convert is to be started, the HwCb H can not be changed because it is already in process, and can not allowed to continue because it may start the next HwCb. Then an abort of the HDMA op is required. When the op started the next Cb in the chain, we assume the abort missed the HDMA op and in this case, the op is converted. If the chain stopped, an abort event results and the chain is not converted. In some cases, when an abort may have missed the HDMA op or not, then the op is converted and requires handling if the op was converted but had not actually finished the HDMA. When an abort event arrives asynchronously, the abort event on HDMA indicated that the HDMA was aborted. If the op was converted but then found the HDMA was aborted, the FW indicators are cleared the HDMA op is rebuilt to be at end of chain and reissued.

Figure 8:
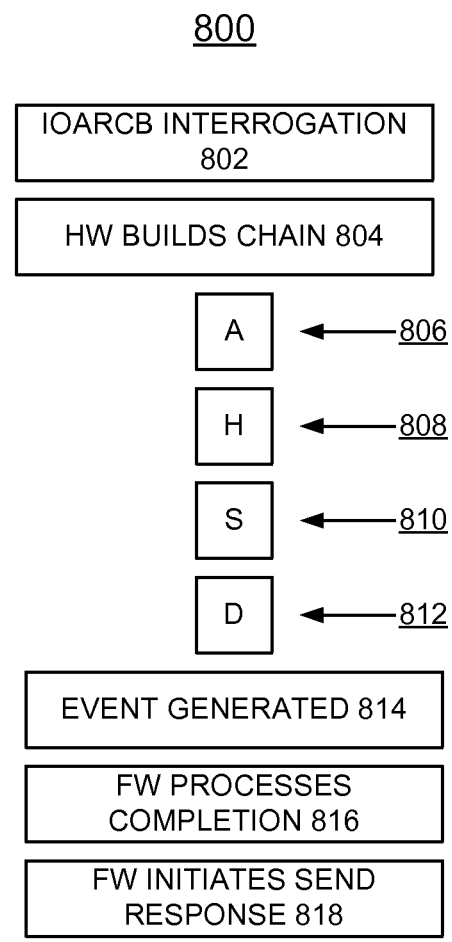
FIG. 8 illustrates an example normal flow implemented by the hardware auto device op initiator in accordance with the preferred embodiment.

Referring now to FIG. 8 illustrates an example normal flow or a good path with an event generated implemented by the hardware auto device op initiator generally designated by the reference character 800 in accordance with the preferred embodiment. Interrogation of an input/output adapter request control block (IOARCB) is performed as indicated in a block 802. The current configuration is capable of using HW auto-execute functions for the IOARCB interrogated at block 802, then the inline hardware engine 118 builds a chain of hardware command blocks to perform the IOARCB as indicated in a block 804 then starts the chain executing as indicated in a plurality of blocks 806, 808, 810, 812 including the respective op A, H, S, D 808. As indicated in a block 814, an event is generated. FW processes completion is provided as indicated in a block 816. Then FW initiates sending a response to the host as indicated in a block 818.

Figure 9:
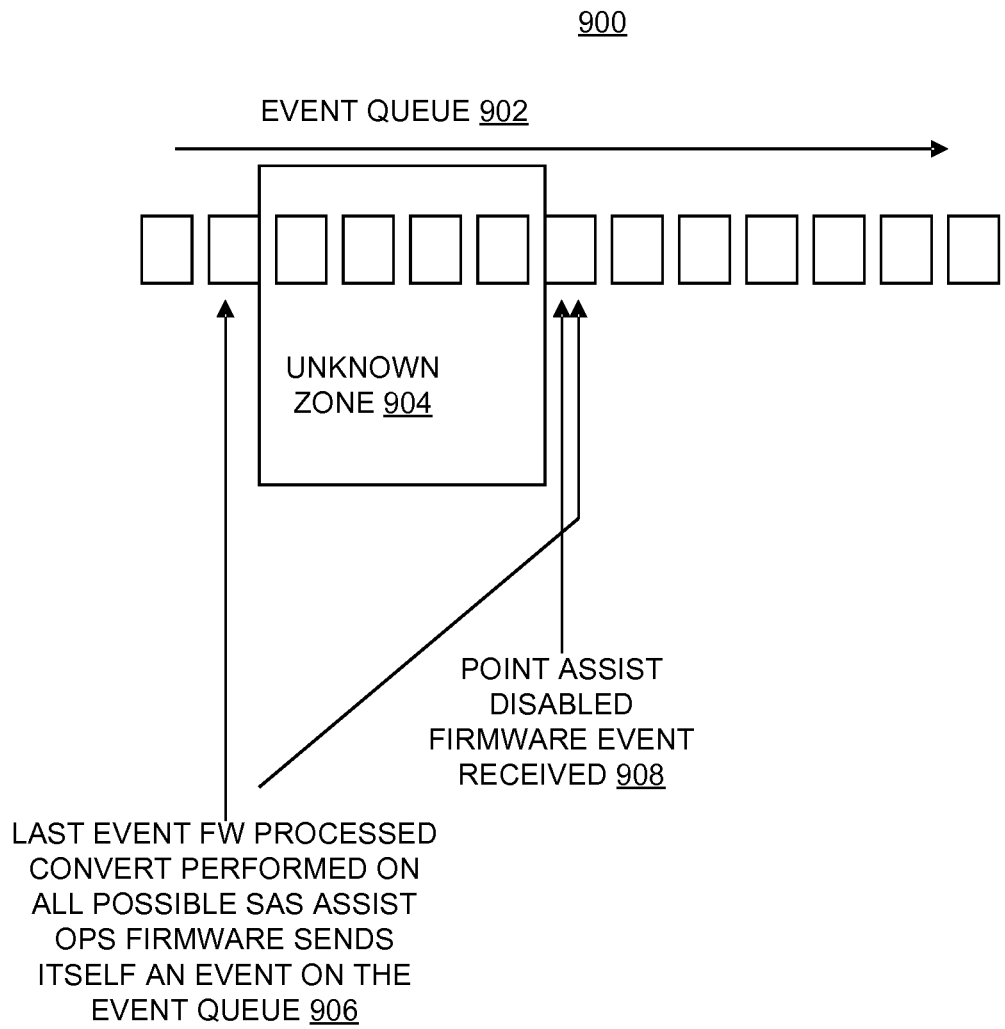
FIG. 9 illustrate an example for enable and disable event queue operations implemented by the hardware auto device op initiator in accordance with the preferred embodiment.

Referring now to FIG. 9 illustrate examples for enable and disable event queue operations implemented by the hardware auto device op initiator generally designated by the reference character 900 in accordance with the preferred embodiment. Enable is generally simple, FW writes some bits into some per resource handle hardware registers 119 of FIG. 1 and after the bits are written, HW auto builds chains for any new ops. Disable is more complicated, because accounting for some asynchronous issues is required.

In FIG. 9, the example enable and disable event queue process 1000 includes an event queue 902 with an unknown zone 904 illustrated between a last event FW processed 906, and a point assist disabled and firmware event received 908. By converting all possible outstanding assist ops, the window of the unknown zone 904 is reduced. Once firmware atomically disables the HW, no more auto ops are produced. All later ops in the event queue 902 after the point assist disabled and firmware event received 908 are not auto-ops. At the last event FW processed 906, convert is performed on all possible SAS assist ops so that there are no unexpected auto op completions and firmware sends itself an event on the event queue. By FW sending itself an event at 906 and receiving it at 908, the window of the unknown zone 904 is bound. Before the FW event, HW may send events saying it started auto-ops. FW must filter these out and account for the conversions it performed during the disable. After the FW event, FW may stop filtering the event queue and return to normal processing of the event queue.

Figure 10:
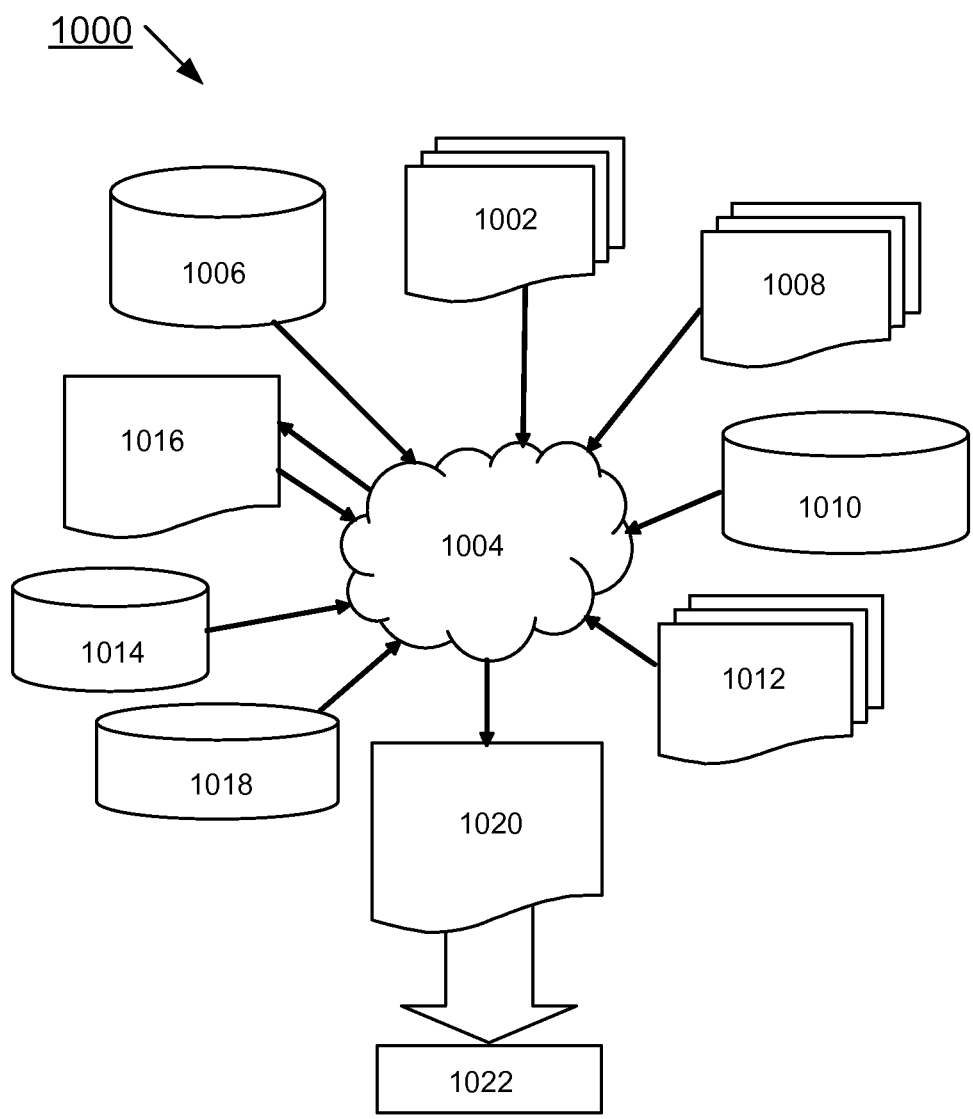
FIG. 10 is a flow diagram of a design process used in semiconductor design, manufacturing, and/or test.

FIG. 10 shows a block diagram of an example design flow 1000. Design flow 1000 may vary depending on the type of IC being designed. For example, a design flow 1000 for building an application specific IC (ASIC) may differ from a design flow 1000 for designing a standard component. Design structure 1002 is preferably an input to a design process 1004 and may come from an IP provider, a core developer, or other design company or may be generated by the operator of the design flow, or from other sources. Design structure 1002 comprises controller 100 and chip 102 in the form of schematics or HDL, a hardware-description language, for example, Verilog, VHDL, C, and the like. Design structure 1002 may be contained on one or more machine readable medium. For example, design structure 1002 may be a text file or a graphical representation of controller 100 and chip 102. Design process 1004 preferably synthesizes, or translates, controller 100 and chip 102 into a netlist 1006, where netlist 1006 is, for example, a list of wires, transistors, logic gates, control circuits, I/O, models, etc. that describes the connections to other elements and circuits in an integrated circuit design and recorded on at least one of machine readable medium. This may be an iterative process in which netlist 1006 is resynthesized one or more times depending on design specifications and parameters for the controller 100 and chip 102.

Design process 1004 may include using a variety of inputs; for example, inputs from library elements 1008 which may house a set of commonly used elements, circuits, and devices, including models, layouts, and symbolic representations, for a given manufacturing technology, such as different technology nodes, 32 nm, 45 nm, 90 nm, and the like, design specifications 1010, characterization data 1012, verification data 1014, design rules 1016, and test data files 1018, which may include test patterns and other testing information. Design process 1004 may further include, for example, standard circuit design processes such as timing analysis, verification, design rule checking, place and route operations, and the like. One of ordinary skill in the art of integrated circuit design can appreciate the extent of possible electronic design automation tools and applications used in design process 1004 without deviating from the scope and spirit of the invention. The design structure of the invention is not limited to any specific design flow.

Design process 1004 preferably translates an embodiment of the invention as shown in FIG. 1 along with any additional integrated circuit design or data (if applicable), into a second design structure 1020. Design structure 1020 resides on a storage medium in a data format used for the exchange of layout data of integrated circuits, for example, information stored in a GDSII (GDS2), GL1, OASIS, or any other suitable format for storing such design structures. Design structure 1020 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIG. 1. Design structure 1020 may then proceed to a stage 1022 where, for example, design structure 1020 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A controller for implementing hardware auto device op initiator in a computer system comprising:
an inline hardware engine for receiving host commands; said inline hardware engine including a plurality of registers providing engine routing information;
said inline hardware engine assessing a received command using enable settings and starting without firmware involvement, responsive to identifying a logical resource configuration capable of using hardware auto-execute functions;
said inline hardware engine building one or more chains of hardware command blocks to perform the received command; and
said inline hardware engine starting executing the one or more chains for the received command and executing an entire chain of said hardware command blocks for each of the one or more chains for the received command with firmware being involved only once with a number of interactions between hardware and firmware being reduced.

2. The controller as recited in claim 1 wherein said inline hardware engine completes executing the one or more chains for the received command to initiate firmware sending a successful completion response to a host system.

3. The controller as recited in claim 2 includes said inline hardware engine generating an event notifying firmware of completion of hardware command blocks for the received command.

4. The controller as recited in claim 1 wherein said inline hardware engine includes predefined registers for each logical host resource to allow auto-executed commands to be enabled and disabled for each host resource.

5. The controller as recited in claim 1 wherein said inline hardware engine includes predefined registers for each logical host resource to directly link each host resource to a physical device.

6. The controller as recited in claim 5 includes said inline hardware engine generating device operations directed at the physical device described within information the registers.

7. The controller as recited in claim 1 wherein said inline hardware engine assessing a received command for starting without firmware involvement includes said inline hardware engine checking to identify a read request or a write request without ordering requirements.

8. The controller as recited in claim 1 includes error and event handling code for handling error completion of a hardware command block within the chain of hardware command blocks for the received command.

9. The controller as recited in claim 8 wherein said error and event handling code handles synchronization and coalescence operations.

10. The controller as recited in claim 1 wherein said inline hardware engine building one or more chains of hardware command blocks to perform the received command includes said inline hardware engine having a direct index mode for building a chain of hardware command blocks using a predefined set of pre-allocated resources for a received command of less than or equal to one page.

11. The controller as recited in claim 1 wherein said inline hardware engine building one or more chains of hardware command blocks to perform the received command includes said inline hardware engine building a chain of hardware command blocks to perform a write command and said inline hardware engine building a chain of hardware command blocks to perform said write command.

12. The controller as recited in claim 1 wherein said chain of hardware command blocks to perform a read command includes an allocate control block to allocate buffer pages, a Serial Attach SCSI (SAS) device op control block to read data into the allocated buffer pages, a host direct memory access (HDMA) control block for data transfer, and a deallocate control block to free allocated buffer pages.

13. A method for implementing hardware auto device op initiator in a computer system comprising:

providing an inline hardware engine for receiving host commands, providing said inline hardware engine with a plurality of registers for providing engine routing information;

said inline hardware engine performing the steps of:

assessing a received command using enable settings and starting without firmware involvement, responsive to identifying a logical resource configuration capable of using hardware auto-execute functions;

building one or more strings of hardware command blocks to perform the received command; and starting executing the one or more strings for the received command and executing an entire chain of said hardware command blocks for each of the one or more chains for the received command with firmware being involved only once with a number of interactions between hardware and firmware being reduced.

14. The method as recited in claim 13 includes said inline hardware engine completing execution of the one or more chains for the received command to initiate firmware sending a successful completion response to a host system.

15. The method as recited in claim 13 wherein providing said inline hardware engine includes providing predefined registers for each logical host resource to allow auto-executed commands to be enabled and disabled for each host resource.

16. The method as recited in claim 13 wherein providing said inline hardware engine includes providing predefined registers for each logical host resource to directly link each host resource to a physical device.

17. The method as recited in claim 13 includes providing error and event handling code for handling error completion of a hardware command block within the chain of hardware command blocks for the received command.

18. The method as recited in claim 13 includes providing error and event handling code for handling synchronization and coalescence operations.

19. A controller for implementing hardware auto device op initiator in a computer system comprising:

an inline hardware engine for receiving host commands;

said inline hardware engine including predefined registers for each logical host resource providing engine routing information and to allow auto-executed commands to be enabled and disabled for each host resource;

said inline hardware engine assessing a received command using enable settings and starting without firmware involvement;

said inline hardware engine building one or more chains of hardware command blocks to perform the received command; and said inline hardware engine starting executing the received command, responsive to identifying a logical resource configuration capable of using hardware auto-execute functions for the one or more chains for the received command and executing an entire chain of said hardware command blocks for each of the one or more chains for the received command with firmware being involved only once with a number of interactions between hardware and firmware being reduced.

20. The controller as recited in claim 19 wherein said inline hardware engine further includes predefined registers for each logical host resource to directly link each host resource to a physical device.

* * * * *